(12) United States Patent
Harrell et al.

(10) Patent No.: US 7,274,661 B2
(45) Date of Patent: Sep. 25, 2007

(54) FLOW CONTROL METHOD FOR QUALITY STREAMING OF AUDIO/VIDEO/MEDIA OVER PACKET NETWORKS

(75) Inventors: Chandlee Harrell, Cupertino, CA (US); Edward R. Ratner, Sunnyvale, CA (US); Thomas D. Miller, Alamo, CA (US); Adityo Prakash, Redwood Shores, CA (US); Hon Hing So, San Jose, CA (US)

(73) Assignee: Altera Corporation, San Jose, CA (US)

(*) Notice: Subject to any disclaimer, the term of this patent is extended or adjusted under 35 U.S.C. 154(b) by 1043 days.

(21) Appl. No.: 10/243,628

(22) Filed: Sep. 13, 2002

(65) Prior Publication Data

US 2003/0067872 A1    Apr. 10, 2003

Related U.S. Application Data

(60) Provisional application No. 60/323,500, filed on Sep. 17, 2001.

(51) Int. Cl.
*H04J 1/16* (2006.01)
*H04J 3/14* (2006.01)
*H04L 1/00* (2006.01)
*H04L 12/26* (2006.01)
*H04L 12/28* (2006.01)
*H04L 12/16* (2006.01)

(52) U.S. Cl. .................................... 370/229
(58) Field of Classification Search ............ 370/218, 370/229–237, 469–472, 252, 254, 328, 338, 370/352, 389, 401, 316, 463, 477, 335, 468, 370/342; 709/231–237, 224, 238, 226, 227
See application file for complete search history.

(56) References Cited

U.S. PATENT DOCUMENTS 5,918,020 A    6/1999 Blackard et al.
6,219,339 B1 *  4/2001 Doshi et al. ............... 370/235
6,388,999 B1 *  5/2002 Gorsuch et al. ........... 370/335
6,452,924 B1    9/2002 Golden et al.
6,487,663 B1   11/2002 Jaisimba et al.
6,526,022 B1 *  2/2003 Chiu et al. .................. 370/229
6,529,475 B1 *  3/2003 Wan et al. ................... 370/231
6,590,603 B2    7/2003 Sheldon et al.
6,671,807 B1   12/2003 Jaisimba et al.
6,714,545 B1    3/2004 Hugenberg et al.
6,728,776 B1    4/2004 Colbath
6,741,552 B1 *  5/2004 McCrosky et al. ......... 370/218
6,760,749 B1    7/2004 Dunlap et al.
6,910,079 B2 *  6/2005 Zimmermann et al. ..... 709/233
2002/0196760 A1* 12/2002 Malomsoky et al. ....... 370/338
2003/0198184 A1* 10/2003 Huang et al. ............... 370/231
2005/0097217 A1*  5/2005 Val et al. .................... 709/233
2005/0232180 A1* 10/2005 Toporek et al. ............. 370/316
2005/0262261 A1* 11/2005 Deshpande ................. 709/231

* cited by examiner

*Primary Examiner*—Chi Pham
*Assistant Examiner*—Prenell Jones
(74) *Attorney, Agent, or Firm*—Okamoto & Benedicto LLP (57) ABSTRACT

A method and apparatus for client-side detection of network congestion in a best-effort packet network comprising streaming media traffic is disclosed. Said method and apparatus provide for quality streaming media services in a congested network with constrained bandwidth over the last-mile link. A client media buffer detects at least one level of congestion and signals a server to enact at least one error mechanism. Preferred error mechanisms include packet retransmissions, stream prioritization, stream acceleration, changes in media compression rate, and changes in media resolution. Said method and apparatus allow distributed management of network congestion for networks comprising multiple clients and carrying significant streaming media traffic.

10 Claims, 9 Drawing Sheets

Representative Protocol Stack Assignments by Network Region

| Protocol layer | A | B | C | D |
|---|---|---|---|---|
| Session | RTSP, ... | | | RTSP, ... |
| Transport | TCP/UDP, RTP | | | TCP/UDP, RTP |
| Network | IP | IP | IP | IP |
| Data Link | Ethernet | ATM | ATM | Ethernet |
| Physical | Ethernet/ 100BaseT | SONET | DSL | Ethernet/ WLAN/ HomePNA |

*Fig. 8b*

FLOW CONTROL METHOD FOR QUALITY STREAMING OF AUDIO/VIDEO/MEDIA OVER PACKET NETWORKS

CROSS-REFERENCES TO RELATED APPLICATIONS

This application claims the benefit of U.S. Provisional Patent Application Ser. No. 60/323,500, filed on Sep. 17, 2001, which is hereby incorporated by reference.

BACKGROUND OF THE INVENTION

1. Field of the Invention

The present invention relates generally to the field of computer networks, more particularly to the flow of audio/video/media data through packet networks, and still more particularly to congestion detection and flow control over packet networks.

2. Description of the Related Art

Media data, such as audio or video data, has traditionally been broadcast over dedicated bandwidth RF (radio frequency) channels to ensure quality delivery to the receiver. With the explosion of the Internet and the accompanying deployment of broadband packet networks, the opportunity has arisen to include entertainment or media services along with other data services on the broadband networks. However, delivering streaming media over broadband packet networks at a marketable quality with current technology is difficult.

Existing best-effort packet networks were not designed for high-bandwidth real-time data, such as streaming video. These networks were designed to accommodate the economic average of data traffic, so they often confront congestion in various nodes of the network when peaks in data traffic occur. Such congestion results in the loss or corruption of packets and thus interferes with the quality level of real-time data. In particular, such congestion can cause interruptions or delays in streaming media, resulting in a quality of service that is inferior to broadcast standards and thus not marketable to a broad customer base.

Much of the general Internet operates as a packet network with the TCP/IP stack of protocols for packet transmission. TCP (the "transmission control protocol") is responsible for breaking data into manageable pieces, reassembling and ordering the pieces at the other end, and retransmitting any pieces that are lost. IP (the "Internet protocol") determines a route for the data pieces between the transmitter and the receiver. Application-level data, such as streaming media data, is broken into pieces and each piece is given a transfer header by TCP. An IP header is then affixed to each piece, followed in some cases by a data link header providing information relevant to the actual data link over which the data will be transferred. At the receiving end, these headers are removed in inverse order until the original data is recovered.

An alternative to TCP called UDP (User Datagram Protocol) may be used at the transport layer. Unlike TCP, UDP does not guarantee delivery, but UDP does deliver packets at a specified rate. It is thus often used for real-time application data. UDP is responsible for packetization, multiplexing, and performing checksum operations to verify the correct packet size. A second protocol, RTP (Real-time Transport Protocol), may be used in concert with UDP to handle data identification, sequence numbering, timestamping, and delivery monitoring.

Figure 1:
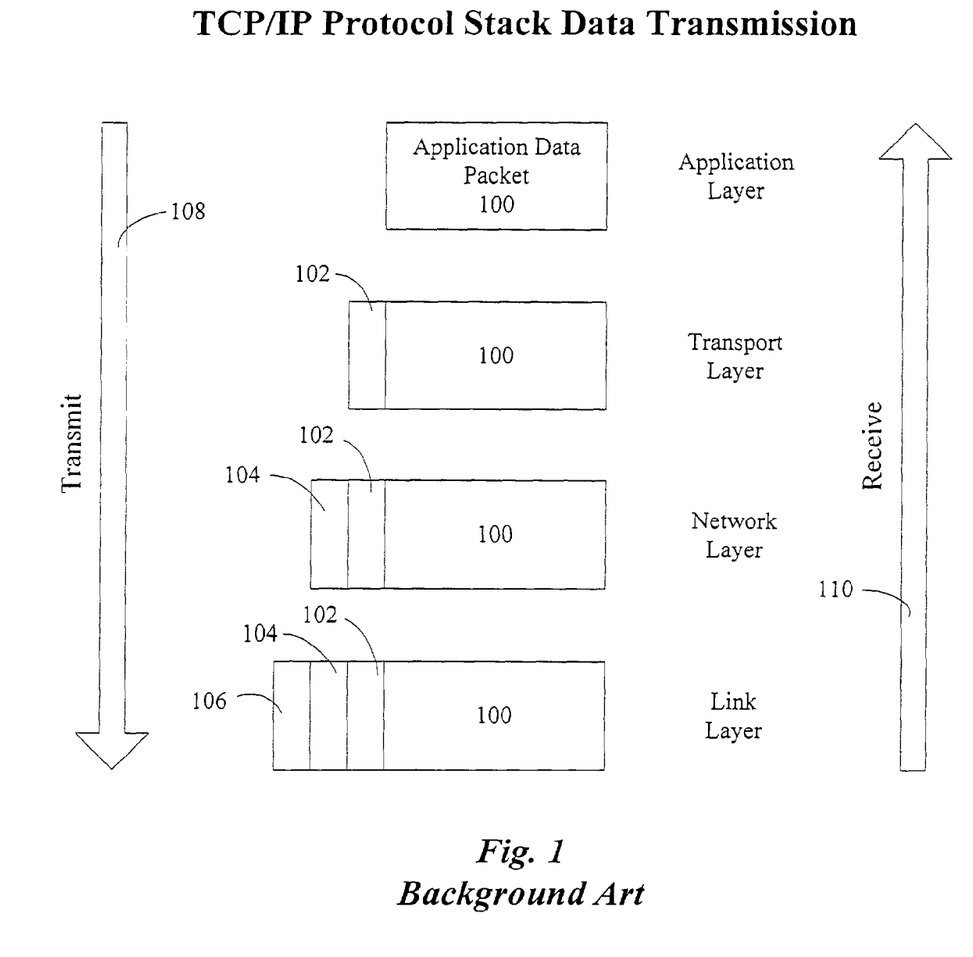
FIG. 1 is an illustration of packet organization in the TCP/IP protocol stack.

FIG. 1 illustrates the organization of packets in the TCP/IP configuration. A packet of application data 100 first has a TCP header 102 attached. In the case of data for a real-time application, the TCP header 102 may be replaced with UDP/RTP header information as discussed above. Then a network layer or IP header 104 is attached, and finally a link layer header 106 is appended. The resulting packet is transmitted 108. As the packet is received 110, the headers 106, 104, and 102 are removed in inverse order so that the original application data packet 100 is available to the receiver.

Regional broadband networks, such as networks providing digital subscriber line (DSL) service into residences over existing telecommunications copper wire infrastructure, are growing in popularity. Such networks provide opportunities to introduce higher quality streaming media because they provide greater ability for network engineering and flow control than for instance the general Internet. These networks typically communicate through the use of the asynchronous transfer mode (ATM) protocol with IP over ATM over SONET (Synchronous Optical Network) for the backbone link and with IP over ATM over DSL for the last-mile link. ATM provides potential quality of service control unlike the TCP/IP protocol family used for the general Internet, but due to the increase in costs associated with commissioning such service, existing telecommunications access networks using ATM are not currently enabled for QoS (quality of service). Packet networks with QoS can reserve the bandwidth necessary for quality media streaming, but the significant expense associated with implementing this specification has thwarted its widespread introduction.

A variety of DSL specifications exist for providing data service over existing copper-wire telephone lines. Asymmetric DSL, or ADSL, is the most popular specification for residential customers, and it is reaching increasing numbers of households. ADSL is capable of providing downstream bandwidth in the 6 Mbps range over shorter distances, but more typically it can provide on the order of 1.5 Mbps of downstream bandwidth and 384 kbps of upstream bandwidth to a broad customer base. The potential for video content delivery over the general Internet, and specifically over DSL networks, is great, but its realization has been constrained not only by network congestion issues but also by the excessive bandwidth required for most quality video data. However, recent video compression advances by the assignee of this invention and potential future research allow broadcast quality video to be provided at compression ratios that are consistent with the typical 1.5 Mbps bandwidth constraint of ADSL.

As improving compression ratios make streaming video over ADSL or other constrained bandwidth networks feasible, several problems with implementation arise. In the presence of network congestion and a constrained last-mile link with limited headroom for error recovery, means must be found for avoiding error due to congestion-induced packet loss so that a service provider can maintain delivery of a high quality media stream to the client subscriber. Furthermore, as streaming media, especially video, proliferates and consumes significant bandwidth network-wide, flow control techniques for managing network-wide congestion increase in importance.

Existing flow control strategies for streaming media are minimal. Such strategies typically rely on server-side detection of congestion. Servers can monitor NACK (negative acknowledgement) signals that indicate when a client has not received a complete packet, and they can also monitor RTT (return trip time) to find how long packet transmission has taken. In the case of streaming over TCP/IP networks, TCP can guarantee loss-less delivery of packets but not timely delivery. Servers can initiate flow control measures such as stream switching when they detect network congestion. Such measures typically result in pausing of the stream and rebuffering with relative frequency. This interruption of service is unacceptable for a streaming media provider who wishes to market competitive high quality entertainment services to customers.

SUMMARY

The present invention provides means for ensuring the delivery of quality streaming media to clients over packet networks that are subject to congestion situations. More specifically, this invention provides a novel solution to the problem of avoiding error in a media stream across a congested network with a constrained last-mile link. This invention also addresses the problem of managing network congestion when streaming media data consumes a significant share of network bandwidth, regardless of last-mile bandwidth availability.

One embodiment of the invention comprises a method and apparatus for client-side detection of network congestion in a packet network featuring broadcast quality streaming media from a server to at least one client. Another embodiment of the invention provides a method and apparatus for client-initiated error avoidance and flow control to ensure that network congestion does not disrupt the media stream from reaching the client. Another embodiment of the invention provides a method and apparatus for system-wide congestion control via distributed client-side congestion detection and distributed client-initiated error avoidance and flow control.

In one specific embodiment, a client receives a media stream into a media buffer, and the media buffer detects a plurality of levels of network congestion by monitoring the buffer level. The client is able to request a plurality of service adjustments from the media server in response to the plurality of congestion levels to avoid errors in the playback of the media stream. Such adjustments may include packet retransmissions, stream prioritization, stream acceleration, changes in media compression rate, changes in the enhancement layer or layers in the case of multi-layered streams, dropping B frames in the case of video streaming, changes in media resolution, and maintaining audio while dropping video in exceptional cases. These adjustments allow the client to continue its continuous media stream with full quality whenever possible, and with gracefully decreased quality in the statistically rare instances when network congestion prevents the continuous transmission of the full-quality stream.

BRIEF DESCRIPTION OF THE DRAWINGS

A further understanding of the nature and the advantages of the invention disclosed herein may be realized by reference to the remaining portions of the specification and the attached drawings.

FIG. 8b is a chart listing the network protocols specified for the various regions of the access network in FIG. 8a.

To aid in understanding, identical reference numerals have been used wherever possible to designate identical elements in the figures.

DETAILED DESCRIPTION OF THE SPECIFIC EMBODIMENTS

1 Introduction

One embodiment provides a solution to the problem of providing uninterrupted streaming media over IP networks, such as telecommunications access networks, that do not otherwise guarantee Quality of Service (QoS). In particular, it provides for error avoidance despite limited recovery headroom in the last-mile link. For example, the invention might be applied to provide quality streaming of 1.1 Mbps of audio/video along with data and overhead over a 1.5 Mbps ADSL link. In another example, the invention might be applied to deliver two 1.25 Mbps audio/video streams along with overhead and data over a single 3 Mbps link to a client.

The invention is especially useful when streaming media traffic, such as for instance streaming video, consumes a significant proportion of the bandwidth of the access network. In this case, adjustments in the bandwidth required for individual media streams can significantly impact the congestion level of the overall network, which can then improve the quality of the media streams themselves. In fact, the invention can reduce the overall congestion level even in the general case when client last-mile links are not constrained. The invention is also applicable to other packet networks, such as for instance wireless data networks. It can also provide improvement in media streams over general IP networks, although the preferred embodiment is tuned more specifically to providing a marketable broadcast quality of streaming media over telecommunications access networks. The teachings of the present invention can be extended in other embodiments to cover many other packet network configurations. The remainder of this specification will focus on a specific embodiment of the invention and several alternatives, but this specific embodiment and its stated alternatives should not be construed as limiting the invention itself or its applicability in other contexts.

2 Problems Addressed

As mention above in the Description of the Related Art, two key issues emerge as streaming media is offered over packet networks with constrained last-mile bandwidth. The first issue arises in the context of a single client occupying a negligible percentage of overall network bandwidth and having limited headroom in the last-mile link. In this scenario, changes in the individual client stream cannot affect the congestion situation of the network as a whole so measures must be taken to avoid error within the existing congestion situation. If there were no last-mile bandwidth constraint, in contrast, simply increasing the bandwidth devoted to the client's media stream would allow for packet replacement and error avoidance. A typical last-mile link over an ADSL connection might allow 1.5 Mbps of total data, 0.4 Mbps of which might be devoted to overhead information and a data channel, leaving 1.1 Mbps for raw video and audio content. If the media stream consumes all or most of this 1.1 Mbps allotment to provide quality content, then after subtracting out protocol overhead there is very little room to push additional bits through the last-mile link to make up for the loss of packets. Congestion loss may exceed the headroom available for traditional error recovery. Other strategies are needed to ensure that these packets are replaced before playback of the stream is corrupted.

The second issue relates to the effects of streaming media traffic itself on overall network congestion. This second issue does not depend on a constrained last-mile link, but applies also to the general situation of unconstrained links to each client. As streaming media, and streaming video in particular, achieves broader and higher quality deployment, it is likely to consume a significant proportion of available bandwidth over entire packet networks. In this scenario, adjustments of the media streams themselves can impact the overall network congestion level. Thus, practical measures to adjust media streams to maintain quality for individual clients throughout the network can have the additional impact of improving the congestion situation of the network as a whole. For example, suppose that streaming video accounts for 50% of all traffic over a network, and suppose that 20% of all packets are lost due to network congestion. In real settings, the rate of packet loss will typically vary across some statistical distribution, but for simplicity of illustration suppose that the rate is a uniform 20%. If each client individually drops its bit demand for its video stream by 40%, then the network will experience a 20% drop in overall traffic (from the 40% drop in the content consuming a 50% share of overall traffic). This drop in overall network demand will alleviate the congestion situation and will eliminate the 20% packet loss rate altogether. Such a drop in client demand will work equally well to alleviate statistically varying congestion situations that are more typical of real networks.

The remainder of the specification will provide details of a method for client detection of network congestion and client-initiated measures to avoid error and to improve the congestion situation of the network. In its applications, this method addresses both of the above issues associated with streaming media over packet networks and thus provides a significant advance in the art.

3 Detailed Description of the Drawings 3.1 Overview

Figure 2:
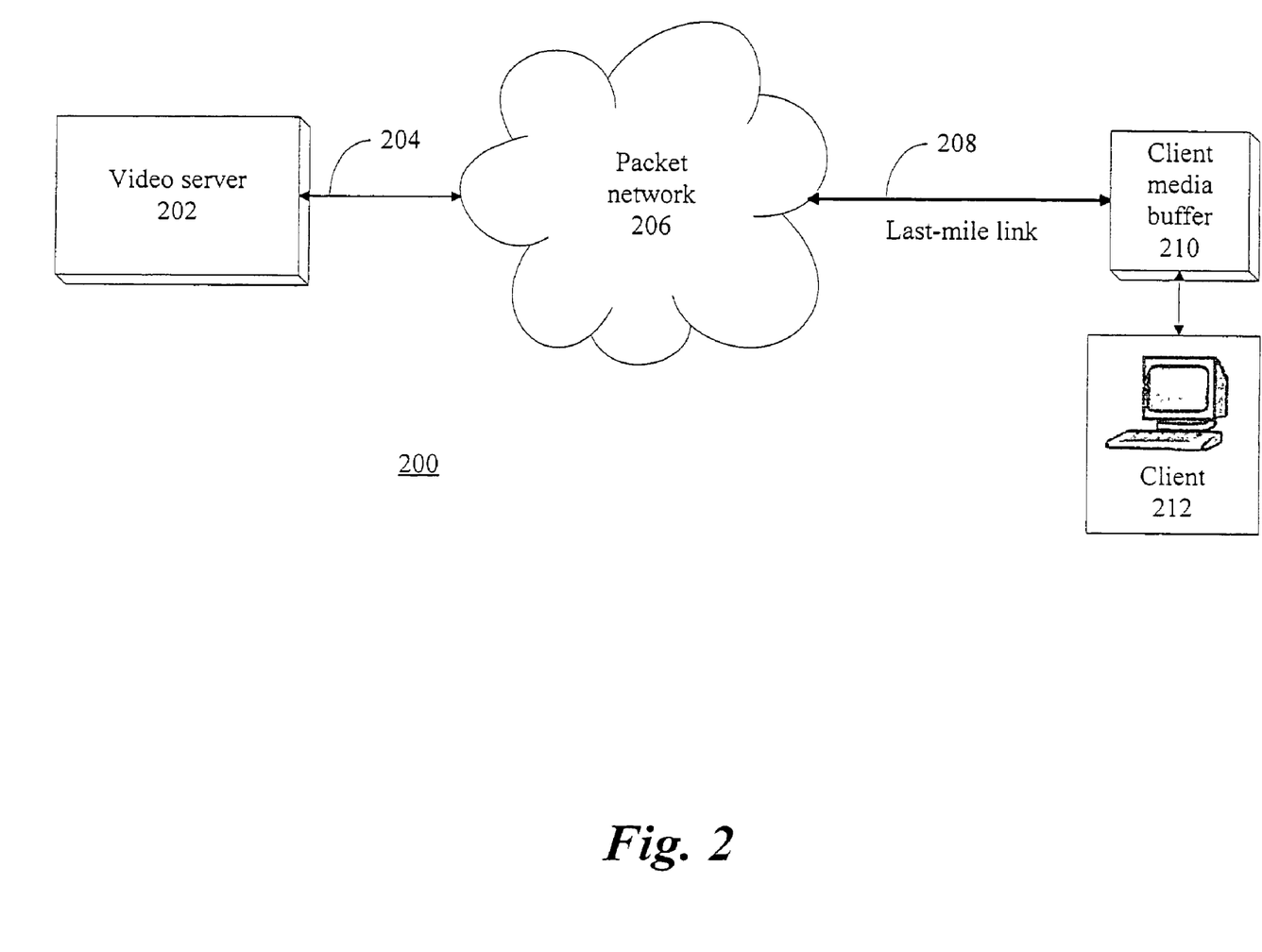
FIG. 2 is a diagram of a packet network to which the present invention applies.

FIG. 2 illustrates at a high level a typical packet network configuration to which the disclosed method applies. The network 200 is comprised of a server 202 that is connected to an access network 206 by a link 204, and a client 212 that is attached to a client media buffer 210 that is in turn attached to the access network 206 by a last-mile link 208. In many cases, the last-mile link 208 will have constrained bandwidth, implying that there is little headroom over the required media rate for error packet recovery in the case of lost or bad packets. Most current network links to consumers have constrained bandwidth over the last mile, limiting the rate at which data packets can be transferred. Examples of such links include digital subscriber line (DSL) connections, cable modem connections, traditional dial-up modem connections, wireless data network links, etc.

The client media buffer 210 plays an important role in providing an error-free media stream to the client. A buffering portion and a signaling device operatively coupled to the buffering portion that can send signals to the server 202 together comprise the client media buffer 210. The buffer is large enough to allow recovery from infrequent packet loss through at least one congestion detection mechanism. In response to at least one detected congestion level, the buffer may implement at least one error avoidance mechanism. For instance, the buffer duration is long enough to allow packet retransmission before the lost packet obstructs the client's media streaming experience. The buffer may also be able to detect heavier congestion situations with enough lead time to allow a switch to a lower bit rate video stream. This switch prevents any hesitation or interruption in the frame sequence but may cause an acceptable degradation in video quality during a lower-bit-rate streaming period. Preferably, the buffer can detect multiple levels of network congestion and can initiate multiple levels of error handling for graceful degradation through statistically less frequent congestion error situations.

In the preferred embodiment, the client media buffer operates as a well-known FIFO (first in, first out) buffer under good network conditions. However, the buffer additionally contains a plurality of zones, corresponding to time increments of media data remaining in the buffer, which indicate a plurality of network congestion levels and consequently a plurality of levels of danger for stream interruption. During normal (i.e. low congestion) conditions the server provides a stream at a rate equaling the playback rate of the media. The buffer fills to an equilibrium level before playback begins, and then in the absence of congestion the input/serving rate equals the output/playback rate so that the buffer level remains at this equilibrium. If network congestion causes the loss or delay of some packets, then the buffer level will begin to drop. When it drops below a critical level (where buffer levels are measured as playback time remaining), the client media buffer detects congestion and begins signaling the server to avoid a playback error. If the buffer level continues to drop, it will cross another critical level at which the client signals the server to take more aggressive action to avoid letting missing packets traverse the entire buffer length. The critical buffer levels for the preferred embodiment and the actions taken as each is crossed will be explained further with respect to accompanying figures.

3.2 Client Media Buffer—Normal Mode

Figure 3:
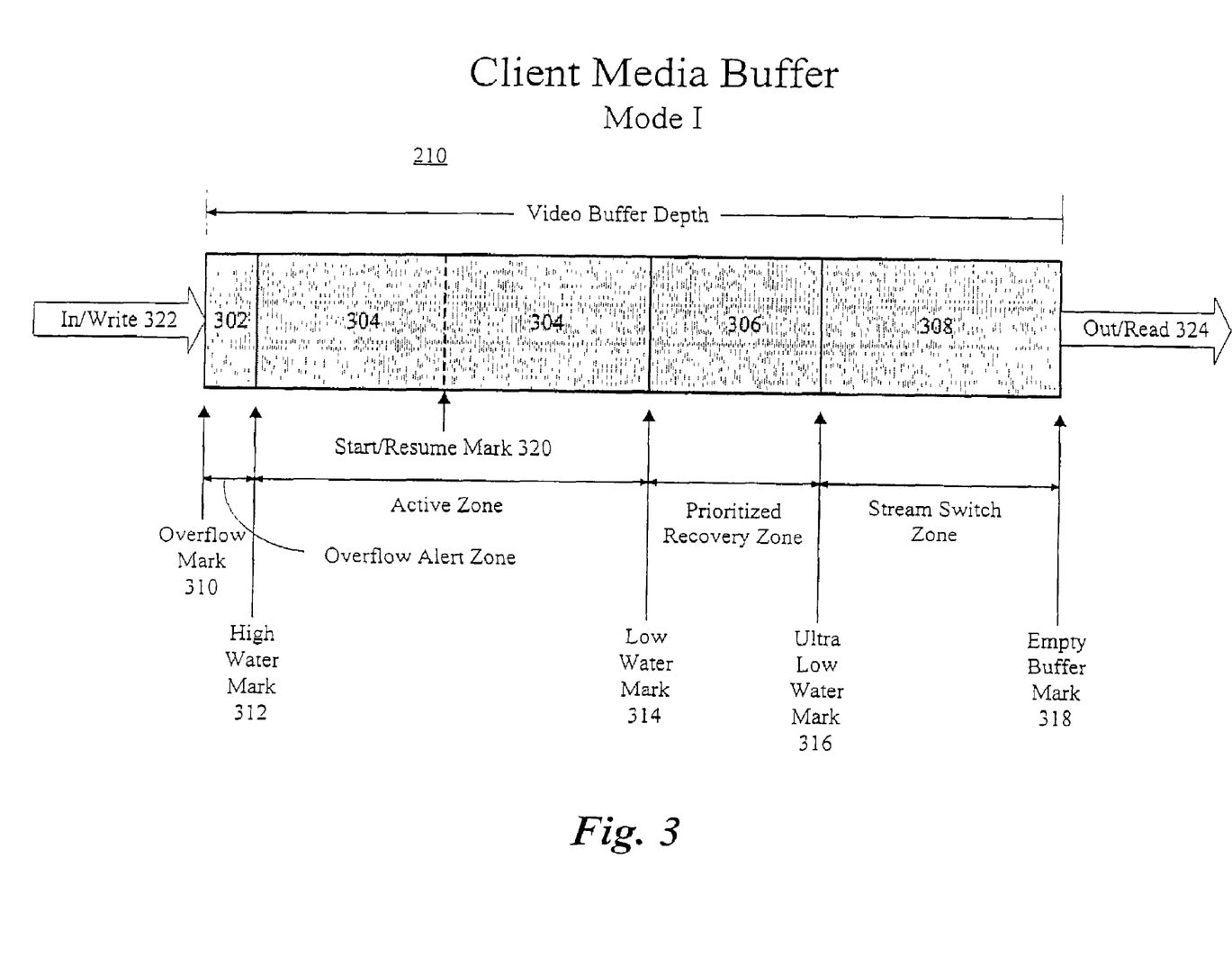
FIG. 3 is a diagram of a client media buffer operating in a first mode.

FIG. 3 illustrates the client media buffer 210 of the preferred embodiment when operating in a normal mode, with media streaming at best quality. The buffer receives packets from the network at an In/Write 322 side, and transmits the sequenced data to the client at an Out/Read 324 side. The buffer transmits the data to the client at the desired playback rate, so after an initial build-up phase the buffer empties its contents at a constant rate. The server 202 preferably delivers media data to the buffer at this same playback rate so that an equilibrium buffer level is maintained. In FIG. 3, the Start/Resume mark 320 indicates this equilibrium level under congestion-free conditions. This level lies at the middle of an Active Zone 304 of the video buffer.

If the server provides data more quickly, it is possible to overflow the buffer and thus to lose any packets sent while the buffer is fully occupied. For instance, drift in buffer level can occur as a result of differences between the server clock and client clock. A High Water mark 312 allows the buffer to detect when it is nearly full and thus to initiate action to slow the stream down and prevent overflow. The region above the High Water mark 312 is an Overflow Alert Zone 302. When the High Water mark 312 is reached, the client begins sending signals to the server telling it to pause serving. The client continues to send these signals until the buffer level returns below the High Water mark 312. When the buffer level drops back to the Start/Resume mark 320, the client signals the server to resume serving. In case the client's pause signals do not reach the server because of network congestion, the buffer may completely fill and then begin to overflow. An Overflow mark 310 indicates that overflow has occurred and data may be lost. Preferably the Overflow Alert Zone 302 is of sufficient size to prevent this error situation from occurring. In the unlikely event that the Overflow mark 310 is reached, the client continues sending pause signals to the server.

In light congestion situations, occasional packets may be lost or corrupted. The client media buffer recognizes these errors via packet sequencing and a checksum operation. The buffer periodically requests retransmission of lost or corrupted packets by the server as needed. The server sends retransmitted packets with top priority to replace these packets before they cause a client error during playback. As congestion worsens, however, these retransmissions may not always be completed in ample time to avoid error because of limited recovery headroom in the link, so further steps are initiated by the client media buffer.

A Low Water mark 314 indicates that the buffer is being depleted, i.e. the rate at which data is being received is lower than the playback rate. The buffer may deplete to this level for instance if the server clock is slightly slower than the client clock. Also, a missing packet may fall below the Low Water mark 314 if it has not been recovered in time by normal retransmission requests. In either situation, the client buffer detects a first level of network congestion and enters a Prioritized Recover Zone 306. In this zone, the available headroom in the last-mile link is used aggressively to attempt to recover the one or more lost packets as quickly as possible and to refill the buffer. Upon entering the Prioritized Recovery Zone 306, the client signals the server to increase attention devoted to the target stream. This signal causes the server to initiate measures for priority serving, including raising the kernel process priority for the target stream, increasing the stream metering rate slightly (e.g. to 110% of the normal rate), and using a higher DiffServ level, if available. DiffServ, for Differentiated Services, is a protocol for specifying and prioritizing network traffic by class that is specified by a six-bit field in the header for the IP protocol. DiffServ is a new protocol proposed by the Internet Engineering Task Force (IETF) that may be available over some IP networks.

An incremented metering rate is included to speed up serving in the case when the server's clock is slightly slower than the client's clock, or to recover a lost packet as quickly as possible by using all of the available last-mile headroom. This metering adjustment is particularly tuned to the case of a single client that has negligible influence on congestion in a large network. Note that in the case of many clients detecting congestion on a network with heavy video traffic, increasing the streams' metering rates may impact congestion since it requires faster data transmission. To mitigate this concern, the relative increase in the metering rate may be engineered in light of the expected network traffic loads and headroom constraints over the last-mile links, and the amount of increase may be reduced during more serious congestion situations involving heavy video traffic.

As the buffer refills, no action is taken to change the priority level back to normal until the Start/Resume mark 320 is crossed. At this point, the client signals the server to turn off the measures for priority serving and to resume normal streaming.

However, if the congestion continues or worsens, an Ultra Low Water mark 316 may be reached by either the last received packet or more typically by a lost or corrupted packet. At this point, the buffer enters a Stream Switch Zone 308 and detects a serious network congestion problem. The client signals the server to compensate by switching to a lower-bit-rate encoded stream. As an important feature, the Stream Switch Zone 308 is situated so that the server has time to switch streams before playback is interrupted by data loss in the original stream. This drop in encoding bit rate allows a significant increase in headroom bandwidth over the last-mile link, which is used to help the buffer recover to a safer level. In the case of a video stream, the stream switch preferably occurs at a GOP (group of pictures) boundary since subsequent frames in a GOP depend on a key frame for accurate reconstruction of the sequence. In this case, when requesting a stream switch, the client will also indicate the boundary of the last complete GOP in the buffer. Depending upon the proportion of the unfinished GOP in the buffer, the server will decide either to replace it with a new lower-bit-rate GOP or to finish that GOP at the higher bit rate before switching to the lower-bit-rate stream. For instance, if only a few frames of a GOP remain unsent, the server can determine that it saves more bits to send those few frames at a high bit rate per frame rather than to replace almost an entire GOP of frames at a lower bit rate per frame (such a tradeoff depends on the specific bit rates at which the two streams are encoded). In an alternative embodiment, the stream switch can occur at any frame boundary using known techniques. More specifics on the stream switching process will be provided with reference to FIG. 4 below.

Note that delivering a lower-bit-rate stream will degrade the quality slightly, but the transition will be smooth and playback interruption will be avoided. Such an error mechanism is far more acceptable than the visual artifacts or the lengthy rebuffering interruptions caused by existing streaming technologies. A complementary video codec developed by the assignee allows VHS quality video even at an encoded bit rate of 400 kbps, less than half of the 1.1 Mbps needed for the preferred standard definition stream, guaranteeing a marketable quality level with the disclosed invention. Similar results can be achieved with other codecs, as for instance with MPEG2 over a 3-4 Mbps last-mile link. In addition to preventing interruption of the stream to the target client, stream switching also reduces the bandwidth demands on the network and thus can improve the overall network congestion situation (as explained in the Problems Addressed section above).

In the statistically rare case of a drastic congestion situation, the buffer may continue to empty until an Empty Buffer mark 318 is reached. Since this situation can only arise after the buffer reaches the Stream Switch Zone 308, it will be described with reference to a second mode, the stream switch mode, of buffer operation.

3.3 Client Media Buffer—Stream Switch Mode

Figure 4:
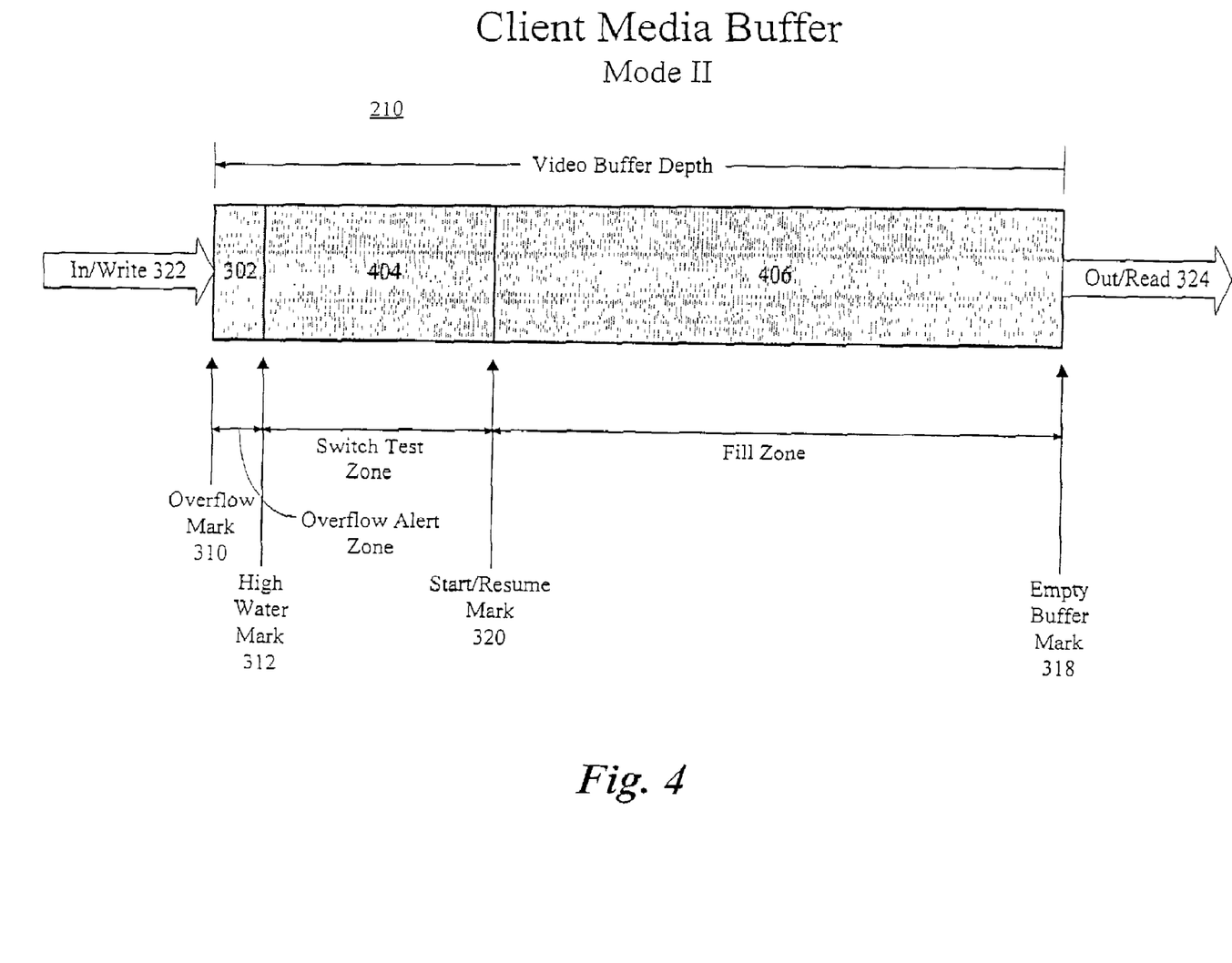
FIG. 4 is a diagram of a client media buffer operating in a second mode.

FIG. 4 illustrates the client media buffer 210 of the preferred embodiment when operating in the second mode, with media streaming at a lower encoded bit rate. In this mode, the buffer contains fewer zones since fewer options remain for handling congestion. When lower-bit-rate streaming begins, the buffer level will be in a Fill Zone 406. As the metering rate is increased, as described below, the buffer may refill. The term bit rate is here used to refer to the number of bits per second expended for the compressed playback stream, while metering rate is used to refer to the speed at which the server actually delivers bits to the buffer (so for instance a low-bit-rate stream may be delivered at a high metering rate in order to refill the buffer quickly). When the buffer level reaches the Start/Resume mark 320 with no lost or corrupted packets, it enters a Switch Test Zone 404. Note that the Start/Resume mark 320 is typically located at the same buffer playback time mark as in the buffer's first mode in the preferred embodiment. If instead the buffer level drops all the way to the Empty Buffer mark 318, then the buffer underflows. In this statistically rare event, which will only occur as an exception in the most extreme congestion scenario, the buffer pauses playback until the buffer refills to the Start/Resume mark 320.

If the buffer level rises to the High Water mark 312, the client signals the server to pause serving. The client continues sending the pause signal until the level drops below the High Water mark 312. When the level returns to the Start/Resume mark 320, the client signals the server to resume serving at the lower bit rate.

When the buffer level enters the Switch Test Zone 404, the server prepares to switch to the higher-bit-rate stream. Hysteresis is introduced to prevent a premature switch leading to further congestion problems. While serving the lower-bit-rate stream, the server increments the metering rate regularly, but decrements the rate whenever the rate of NACKs rises above some threshold values. If congestion has subsided, then the metering rate will rise until it reaches the maximum metering rate, which preferably equals the encoded bit rate of the higher-bit-rate stream. Upon entry into the Switch Test Zone 404, the server switches back to the higher-bit-rate stream only after the server has served the lower-bit-rate stream at this maximal metering rate without dropping for a threshold period of time. Any drop in the metering rate, for instance caused by a rise in the NACK rate, causes the server's time count to restart. Pauses in serving due to the buffer reaching the High Water mark 312, however, do not interfere with the server's time count since the server resumes at the same high metering rate after such pauses.

In an alternative embodiment, the client determines when to switch back to the higher-bit-rate stream and signals the server to do so. In this case, the server logic to track the NACK rate and the server logic to determine the increases and decreases in the metering rate are replicated on the client side so that the client can determine how long the server has served at the maximal metering rate. The client signals the server to switch after it has received the lower-bit-rate stream at the maximal metering rate without dropping for a threshold period of time.

When in the second mode in the preferred embodiment described above, the buffer levels correspond to playback time increments as before. If the server served the lower-bit rate stream at the playback rate, then the buffer would not refill but would at best remain stable at its low level. Instead, the server utilizes the increased headroom to speed up its delivery of the stream and thus to refill the buffer quickly to a safer level. By raising the metering rate above the actual encoded bit rate, the server is able to refill the buffer during playback. Immediately after the switch to a lower-bit-rate stream, the server meters the stream at the playback bit rate. However, the server aggressively increments the metering rate as long as packets are being delivered. When the rate of NACKs (negative acknowledgements sent from client to server for each lost packet) indicates congestion is significantly preventing packets from being delivered, the server drops the metering rate. If the NACK rate returns to an acceptable level, then the server resumes its cycle of incrementing the metering rate over time.

Eventually, the server may begin serving the low-bit-rate stream at a maximum metering rate that is preferably equal to the bit rate required for the higher quality stream (e.g. 1.1 Mbps). Since playback expends a much smaller number of bits per second (e.g. 400 kbps), this high metering rate will cause the buffer to fill quickly. Typically the buffer will cross into the Switch Test Zone 404 before the maximum metering rate is reached. In fact, as described before, the buffer level will alternate between the High Water mark 312 and the Start/Resume mark 320 with intermittent pauses in transmission, staying in the Switch Test Zone 404. After each pause resulting from hitting the High Water mark 312, the server resumes serving at the same metering rate as before the pause. If the metering rate stays at its maximum level for a threshold length of time, including High Water pauses, then it is likely that the network can once again accommodate the higher-bit-rate stream. The server measures the amount of time it serves at the maximum metering rate, and when the threshold time is reached it switches the stream back to the higher bit rate. This low-to-high switch preferably occurs at the next available GOP boundary, but may also occur at a general frame boundary in an alternative embodiment.

Figure 5:
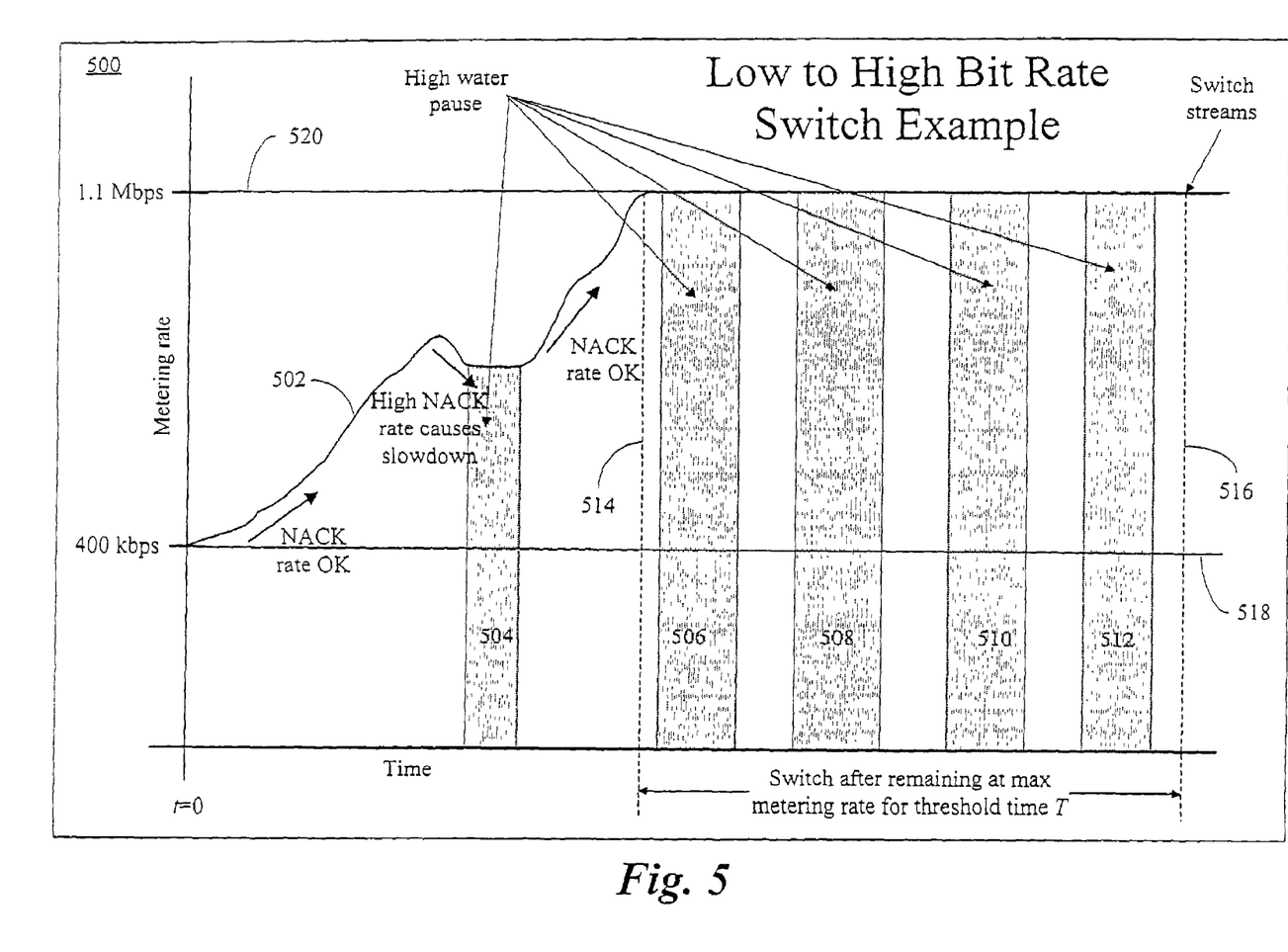
FIG. 5 is a graph showing metering rate for a low-bit-rate stream over time.

FIG. 5 shows a graph 500 illustrating the process of increasing the metering rate and ultimately switching back from the low-bit-rate stream to the high-bit-rate stream in the preferred embodiment. In this example, the high-bit-rate stream requires 1.1 Mbps while the low-bit-rate stream uses only 400 kbps. A vertical axis records the metering rate, or the total number of bits per second delivered by the server to the client media buffer, while a horizontal axis measures time. The metering rate remains between dotted line 518, representing the minimum metering rate, and dotted line 520, representing the maximum metering rate. Curve 502 shows the metering rate for a stream over time. It is important to distinguish the metering rate from the encoded bit rate here, since from t=0 to vertical line 516 the server provides the stream encoded at the lower 400 kbps bit rate but at varying metering rates. Also, at vertical line 516 the encoded bit rate switches from 400 kbps to 1.1 Mbps but the metering rate, indicated by the height of curve 502, remains constant. At time t=0 the server begins serving the low-bit-rate stream at a metering rate matching its playback rate of 400 kbps, but it rapidly increases the metering rate at a regular pace. When the NACK rate rises above threshold values, the server drops the metering rate. The amount of decrease in the metering rate is proportional to the increase in the NACK rate, in this example. When the NACK rate is at a low level, the metering rate continues to rise until it reaches its maximum of 1.1 Mbps at the time indicated by vertical line 514. At this time the server typically has served at a high metering rate for long enough to fill the buffer above the Start/Resume mark 320, so the buffer is in the Switch Test Zone 404. The gray regions 504, 506, 508, 510, and 512 represent time intervals when serving pauses because the High Water mark 312 has been reached. In each case, the left edge occurs when High Water mark 312 is reached, and the server pauses until (at the right edge time) the buffer level returns to the Start/Resume mark 320. After the maximum metering rate is reached at line 514, the server continues to serve at that rate for a threshold period of time, indicated by the distance between line 514 and line 516. Finally, at the time indicated by line 516, the server switches back to the high-bit-rate stream (preferably at the next available GOP boundary or alternatively at the next frame boundary). Note that if the NACK rate had caused the metering rate to drop below 1.1 Mbps before time 516, then the timer would have reset so that the full threshold time was spent serving at the maximum metering rate of 1.1 Mbps before switching back to the high-bit-rate stream. Also note that the time intervals during which the metering rate is at its maximum but serving has paused, indicated by gray regions 506, 508, 510, and 512, are included in the server's count up to the threshold time. Upon switching to the high-bit-rate stream, note that the metering rate of 1.1 Mbps is unchanged but that the metering rate now equals the encoded bit rate, meaning that the stream is metered at a rate just high enough to replenish the buffer as it is depleted by playback.

3.4 Start Mode

When the server begins serving a stream to a client, the client begins with an empty buffer. Some latency must be introduced in order to allow the buffer to fill to an acceptable level before playback begins. In the preferred embodiment, the server begins serving the lower-bit-rate stream at the maximum metering rate (e.g. 1.1 Mbps). The client buffer enters a Buffering Zone, analogous to the Fill Zone 406 of the second buffer mode. If the NACK rate rises above threshold values, then the metering rate is decremented accordingly. When the NACK rate is again acceptable, the metering rate rises until the maximum metering rate is again achieved. When the Start/Resume mark 320 is reached and no lost or corrupted packets are below the Start/Resume mark 320, playback begins. If the metering rate has remained at the maximum level with an acceptable NACK rate, then upon playback the server immediately switches to the higher-bit-rate stream so that the buffer enters the Active Zone 304 and begins operating in its first mode. If, however, the NACK rate was unacceptable during the start-up buffering period, then the server continues serving the lower-bit-rate stream and the buffer enters the Switch Test Zone 404 of its second mode as playback begins.

Figure 6:
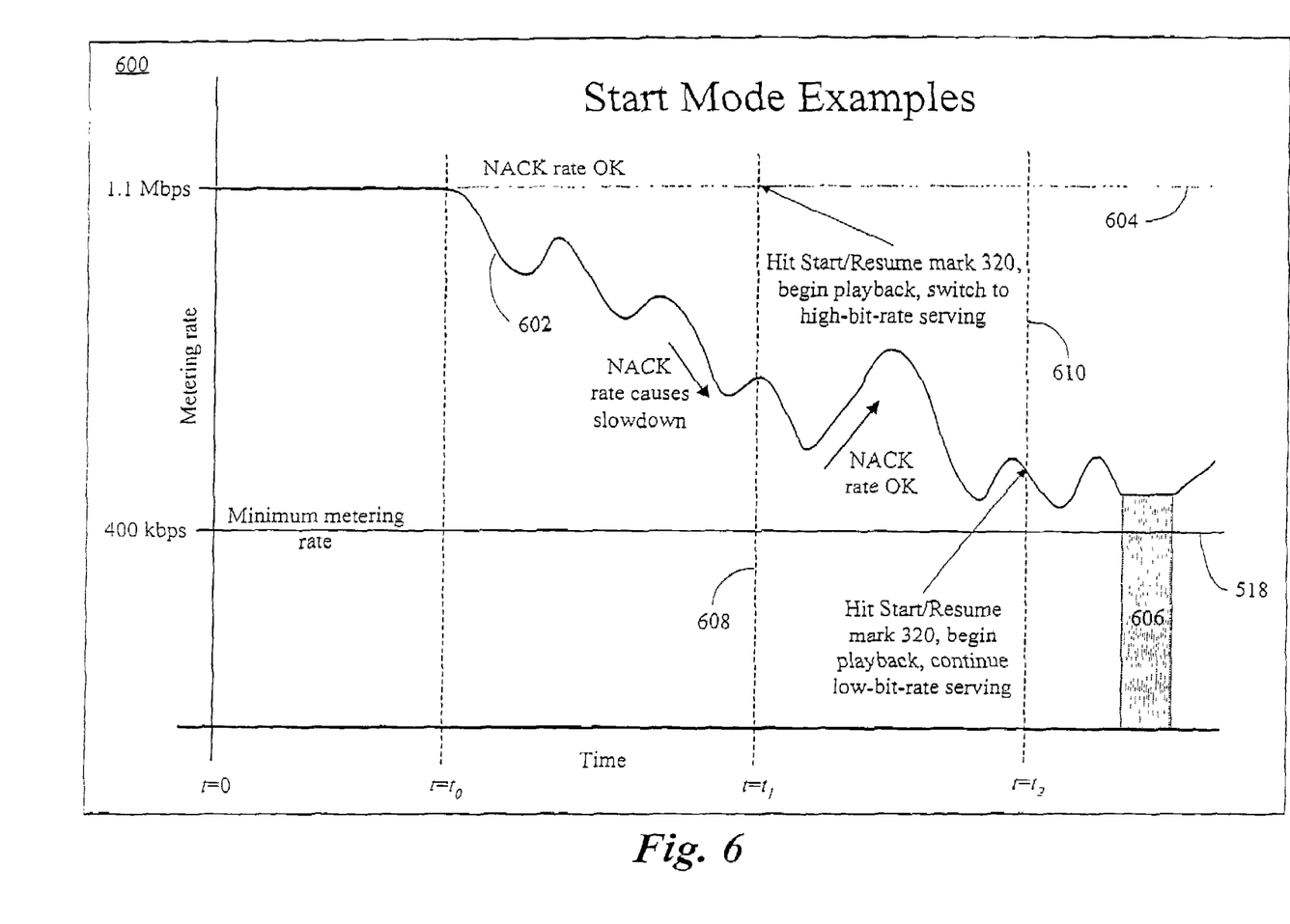
FIG. 6 is a graph showing two examples of the metering rate over time during a start mode.

FIG. 6 shows a graph 600 illustrating the process of filling the buffer upon start up, starting playback, and selecting the low-bit-rate stream or the high-bit-rate stream for continued streaming in the preferred embodiment. In these examples, the high-bit-rate stream requires 1.1 Mbps while the low-bit-rate stream uses only 400 kbps. A vertical axis records the metering rate, or the total number of bits per second delivered by the server to the client media buffer, while a horizontal axis measures time. The metering rate remains between dotted line 518, representing the minimum metering rate, and the maximum rate of 1.1 Mbps. Curve 602 shows the metering rate for a first example start-up stream over time, and curve 604 shows the metering rate for a second example start-up stream over time.

In the first example, the server begins serving the lower-bit-rate stream at the maximum metering rate (1.1 Mbps) at time t=0. At time $t=t_0$, the NACK rate increases beyond a threshold level that can be managed by the available headroom, so the server decrements the metering rate. Curve 602 shows that the metering rate periodically drops as the NACK rate crosses threshold values, but between these drops the metering rate increases at a steady pace when the NACK rate is acceptable. At time $t=t_2$, indicated by vertical line 610, the buffer level has filled all the way to the Start/Resume mark 320. At this time, the client begins playback. Because the metering rate has dropped due to an unacceptable NACK rate during the buffer fill period, the server continues serving the lower-bit-rate stream after playback starts and the buffer begins operating in its second mode. Since the metering rate remains above the minimum metering rate after playback begins, the buffer level continues to rise until it reaches the High Water mark 312. At this point, the server pauses serving until the client indicates that the Start/Resume mark 320 has once again been crossed. The time the server spends pausing its serving is indicated by the gray region 606.

In the second example, the server again begins serving the lower-bit-rate stream at the maximum metering rate at time t=0. The NACK rate remains at an acceptable level, so the metering rate remains at its maximum level, as indicated by curve 604. At time $t=t_1$, indicated by vertical line 608, the buffer level has filled all the way to the Start/Resume mark 320. At this time, the client begins playback. Note that because the metering rate remained at a higher level in this example than in the previous example, the buffer fills to the Start/Resume mark 320 more quickly (i.e. time $t_1<t_2$). Since the metering rate stayed at its maximum level during the buffer fill period, the server immediately switches to the higher-bit-rate stream when playback begins at time $t_1$. The portion of curve 604 appearing after time $t_1$ thus illustrates the 1.1 Mbps encoded stream being served at 1.1 Mbps.

In alternative embodiments, the server may always switch to the higher-bit-rate stream when the Start/Resume mark 320 is reached, or it may always keep the lower-bit-rate stream until a stream switch is indicated by the usual mechanism. The initial frames are preferably served at the lower bit rate in order to fill the buffer more quickly and thus to reduce the start-up latency period. In another embodiment, however, the server might begin streaming at the higher bit rate and the buffer might enter the Active Zone 304 and begin playback when the Start/Resume mark 320 is reached.

3.5 Retransmissions

Regardless of the mode or zone in which the buffer operates, it can request retransmission of bad packets from the server. In this sense, retransmission requests serve as the first attempt at recovering any bad packets. These retransmission requests occur when a timeout condition is violated or when the UDP protocol (or a similar alternative protocol) detects a checksum error in a received packet. In these cases the client sends a NACK back to the server. The transport of client NACK packets and of server retransmission packets can be prioritized through DiffServ, if available, so that these necessary packets can be delivered ahead of other traffic. The response times for these packets should be at a level that is consistent with replacing lost data before it reaches the Ultra Low Water mark 316 in the client media buffer's first mode in all but statistically rare circumstances.

3.6 State Diagram Description

Figure 7:
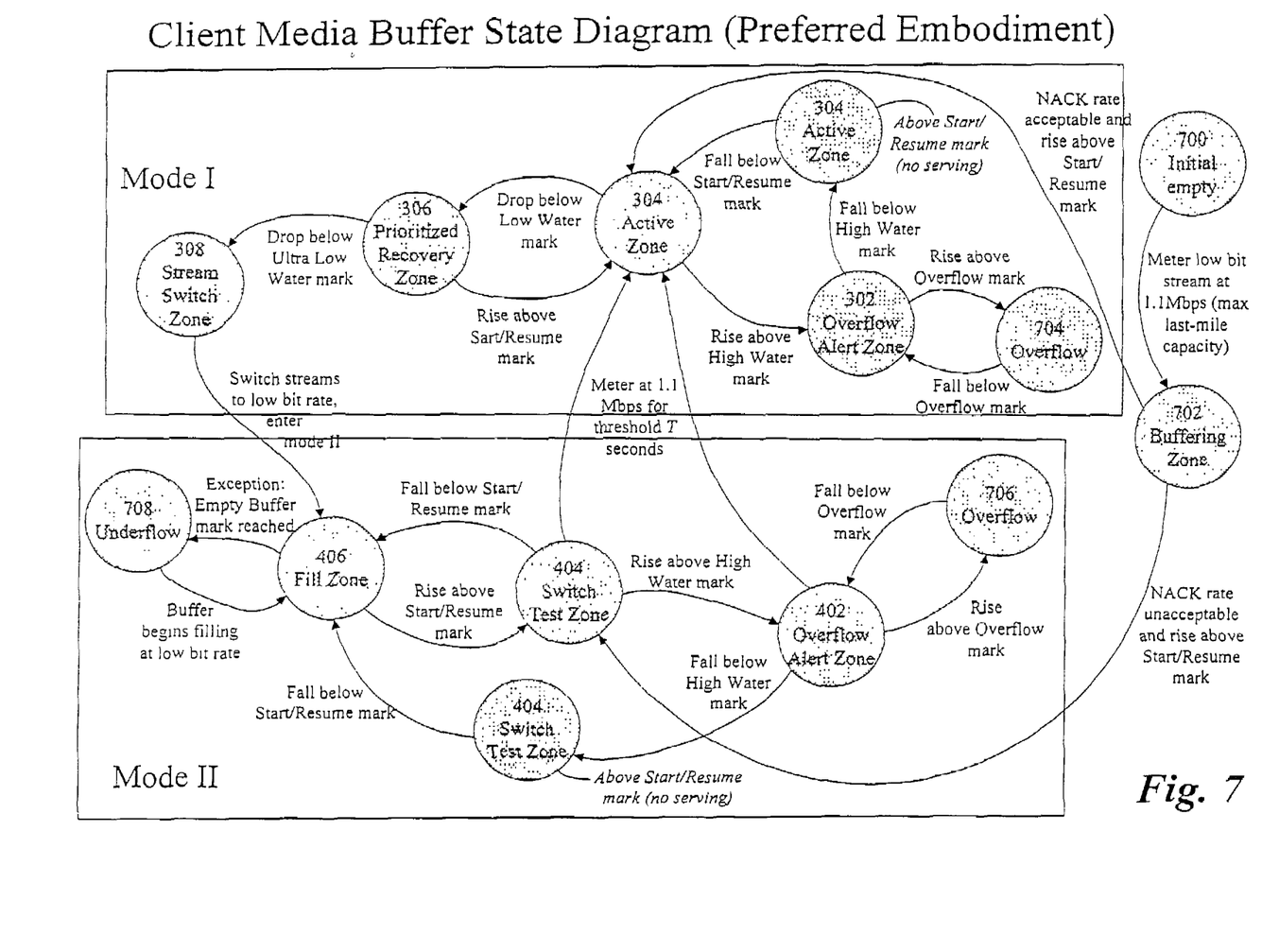
FIG. 7 is a state diagram describing the operation of a client media buffer in a preferred embodiment.

FIG. 7 is a state diagram for the client media buffer of the preferred embodiment, which further explains the relationships between the various buffer zones, the two modes of buffer operation, and the start mode. Before streaming begins, the buffer is in an Initial Empty state 700. Upon initialization, the buffer fills with the low-bit-rate stream (and does not begin playback) until the Start/Resume mark 320 is reached. During this buffering period, the buffer is in a Buffering Zone 702. When the Start/Resume mark 320 is reached, the buffer begins transferring data for playback to the client, and it begins operating in one of its two standard operating modes. If the buffer had an unacceptable NACK rate during the buffering period, then upon reaching the Start/Resume mark 320 it enters the Switch Test Zone 404 and operates in the second mode. If, however, the buffer filled with an acceptable NACK rate, then the server immediately switches to the higher-bit-rate stream when the Start/Resume mark 320 is reached and the buffer begins operating in its first mode in the Active Zone 304. The remaining states will be described by tracing the possible transitions of the buffer.

Suppose the buffer is in the Active Zone 304. If the buffer level rises above the High Water mark 312, then the buffer transitions to the Overflow Alert Zone 302 and it requests that the server pause serving. The buffer transitions back to an Active Zone 304 if the level falls back below the High Water mark 312, but at this point the server is not serving. After the level drops below the Start/Resume mark 320, the server resumes serving and the buffer returns to the Active Zone 304 with serving. From the Overflow Alert Zone 302, if the buffer level continues to rise until the Overflow mark 310 is reached, then the buffer enters an Overflow state 704 and data is lost. When the level drops slightly below the Overflow mark 310, the buffer reenters the Overflow Alert Zone 302.

Also from the Active Zone 304, if the buffer level or a bad packet drops below the Low Water mark 314, then the buffer enters the Prioritized Recovery Zone 306. If the level rises back above the Start/Resume mark 320 (and not before), then the buffer transitions back to the Active Zone 304. However, if the buffer level or a bad packet falls below the ultra Low Water mark 316, then the buffer enters the Stream Switch Zone 308.

When the Stream Switch Zone 308 is reached, the buffer immediately requests that the server switch to the lower-bit-rate stream as explained above. At this point the buffer transitions to the Fill Zone 406 and begins operating in its second mode. From the Fill Zone 406, if the buffer level drops to the Empty Buffer mark 318, then the buffer enters an Underflow state 708. When the buffer refills above the Empty Buffer mark 318, it leaves the Underflow state 708 and reenters the Fill Zone 406 (though playback does not begin again until the Start/Resume mark 320 is once again reached). If the buffer level rises above the Start/Resume mark 320, then the buffer enters the Switch Test Zone 404. From the Switch Test Zone 404, if the buffer level falls below the Start/Resume mark 320 then the buffer reenters the Fill Zone 406. However, if the buffer level rises above the High Water mark 312, then the buffer leaves the Switch Test Zone 404 and enters the Overflow Alert Zone 402. At this point the client begins signaling the server to pause serving. If the level continues to rise until the Overflow mark 310 is reached, then the buffer enters a second-mode Overflow state 706. Once the level falls back below the Overflow mark 310, the buffer reenters the Overflow Alert Zone 402. From this zone, if the buffer level falls once more below the High Water mark 312, then the buffer enters the Switch Test Zone 404 and it stops sending pause signals to the server. However, the server has not resumed serving yet at this stage. If the buffer level falls below the Start/Resume mark 320, then the buffer signals the server to resume serving and the buffer returns to the Fill Zone 406.

As noted earlier, when the buffer is operating in the second mode, only after the server has continued to serve the low-bit-rate stream at a maximum metering rate for a threshold time does the server switch back to the high-bit-rate stream. Note that this transition may arise while the buffer is in either the Switch Test Zone 404 or the Overflow Alert Zone 402. In either case, upon this stream switch the buffer returns to its first mode and enters the Active Zone 304. If the transition occurs from the Overflow Alert Zone 402, then the server can delay the switch sufficiently to guarantee that the buffer level will not be above the Active Zone 304 upon the return to the high-bit-rate stream.

3.7 Client Media Buffer Enhancements and Alternatives

A variety of enhancements and alternatives are contemplated to allow the client to adapt to a broader range of congestion situations with a broader palette of responses.

In one embodiment, the Stream Switch Zone 308 may contain further subdivisions into a plurality of zones, which would then signal the server to switch to a plurality of different encoding bit rates. Rather than switching immediately from a high bit rate to a lowest bit rate with acceptable quality, the server may switch to incrementally lower bit rates in incrementally worse congestion situations. As before, hysteresis is introduced for upward switching to ensure that the congestion situation has improved before recommitting to a higher bit rate.

In another embodiment, the server may change image resolution during stream switching. For example, a high definition video stream encoded at 4 Mbps may switch to a standard definition stream encoded at 1.1 Mbps, then to a CIF/SIF stream encoded at 400 kbps, and so on. In applications to a video-over-DSL link, switching from a standard definition encoded stream to a CIF/SIF encoded stream during a worsening congestion situation is contemplated.

For video streams that are encoded with bi-directionally predicted frames, or B frames, in one embodiment an additional B Frame Recovery Zone may be added to the client media buffer, preferably placed between the Prioritized Recovery Zone 306 and the Stream Switch Zone 308, with an Extra Low Water mark delimiting the upper end of the zone. When the buffer level or a bad packet drops below this Extra Low Water mark, the client begins signaling the server to eliminate B frames from its stream while continuing to serve at the higher bit rate. This response offers an alternative means for easing network congestion while maintaining the client stream at an acceptable quality level. For example, a typical MPEG2 bit stream encoded at 4 Mbps would save 20-40% in bandwidth by dropping all B frames. It is envisioned that the client video decoder in this case would estimate the missing B frames by interpolation, frame replication, or some other mechanism. This serving without B frames continues until the buffer level once again rises above the Extra Low Water mark.

In alternative embodiments, the B Frame Recovery Zone may altogether replace the Stream Switch Zone 308, or B frame dropping may be integrated as one of the measures taken in the Priority Recovery Zone 306. The B Frame Recovery Zone may also be placed below the Stream Switch Zone 308, so that as a final flow control measure the server will drop B frames from the low-bit-rate stream. These alternatives may be selected depending upon the make-up of the encoded video bit stream, the network architecture, and the stream delivery quality goals.

In another embodiment, Forward Error Correction is used to recover from congestion errors occurring below a certain rate. In this embodiment, minor congestion error is initially handled through the known art of Forward Error Correction (FEC) codes that are included in the bit stream, allowing stream reconstruction from the stream itself up to a predetermined amount of error or packet loss. FEC is used before requesting retransmissions. When the threshold level of error manageable through FEC is crossed, retransmission requests and other error correction measures are launched as before.

In another embodiment involving audio/video streaming, the server may prioritize audio ahead of the video streams. If rare exceptional network congestion causes the video buffer to underflow, even despite switching to the lower-bit-rate streams across many clients, this audio prioritization is tuned such that the subscribers never lose the audio track.

In another embodiment, the media may be encoded using multi-layered schemes such as fine-grain scalable coding, which allows incremental scaling of the same scalable bit stream to reduce the bandwidth required for the stream. For instance, an MPEG-4 video sequence may be encoded using known techniques such as Fine Granularity Scalable (FGS) coding or Progressive Fine Granularity Scalable (PFGS) coding. In such coding schemes, a base layer encodes necessary structural information, such as motion vectors, and an enhancement layer encodes detail information, such as for instance residue discrete cosine transform (DCT) components in the case of an MPEG video stream. The enhancement layer may for example be encoded using bit-plane coding. The information in the enhancement layer may be scaled down, for instance by eliminating the least significant bit in the case of bit-plane coding, to incrementally reduce the bandwidth of the stream. The server uses fine-grain scalability as an error avoidance mechanism to reduce the encoded bit rate for a stream. Fine-grain scalability may also be used in concert with stream-switching so that after the server has scaled back the enhancement layer completely, as a next step it switches to a different stream encoded at a lower bit rate (where even the base layer is different). At least in the case of PFGS coding for MPEG-4, such stream switching may be performed seamlessly at a frame boundary. This embodiment expands the process of adjusting the bandwidth required for a stream in response to congestion to a process involving a plurality of fine-scale adjustments associated to a plurality of worsening congestion situations.

In another embodiment, after switching to a lower-bit-rate stream, the server sends blank or unused data to the client to test the network congestion situation rather than continuing to increase the metering rate. This process of sending unnecessary data to test the congestion situation is herein referred to as "jamming." The server first increments the metering rate for the lower-bit-rate stream some amount above the minimum metering rate to fill the buffer, but the metering rate goes no higher. Jamming data is then sent at an increasing rate until the jamming data plus the streaming data together consume the maximum bandwidth available for streaming (preferably equal to the maximum metering rate from before). While the jamming data is not used for media playback, the client still sends NACKs to the server when packets are not received. The server measures the NACK rate as before and decrements the metering rate for jamming data when the NACK rate rises above a threshold. As before, hysteresis is introduced so that the server switches back to the higher-bit-rate stream only after it has served data at the maximum rate for a threshold period of time. Because the metering rate for the actual media stream is limited in its rise, the buffer level hits the High Water mark 312 much less frequently in this scheme. The jamming data thus serves to test the congestion situation for the stream without causing the buffer to fill so quickly, thereby avoiding measurement delays due to stream pausing. As a result, the threshold time before switching back to the higher-bit-rate stream is preferably shorter for this alternative embodiment.

In another embodiment, the client performs calculations directly during streaming to detect and respond to congestion situations rather than using pre-calculated watermarks in the buffer. For instance, if the client knows the encoded bit rate of the current stream, the bandwidth constraint for the link, the current buffer depth, and the location of missing or uncorrected packets in the buffer, then the client can calculate whether there is sufficient time to continue delivering the media stream at the current encoded bit rate within the current bandwidth constraint.

In another embodiment, the server aggregates information about the buffer levels for a plurality of clients and preemptively employs flow control measures to avoid serious congestion. For example, if a plurality of client buffer levels drop to the Prioritized Recovery Zone 306, the server may switch one or more client streams to lower-bit-rate streams before these clients reach the Stream Switch Zone 308 in order to reduce media traffic and thereby to prevent a severe congestion situation.

3.8 Example of Application: Video on Demand over DSL

One application for the disclosed invention arises in providing quality video-on-demand services over a telecommunications access network using IP over ATM. In particular, providing uninterrupted streaming video over DSL (digital subscriber line) links to clients, which make up a growing part of the telecommunications access networks, is a primary goal. More detail for applying the present invention in the DSL setting is discussed below as one useful example.

Figure 8A:
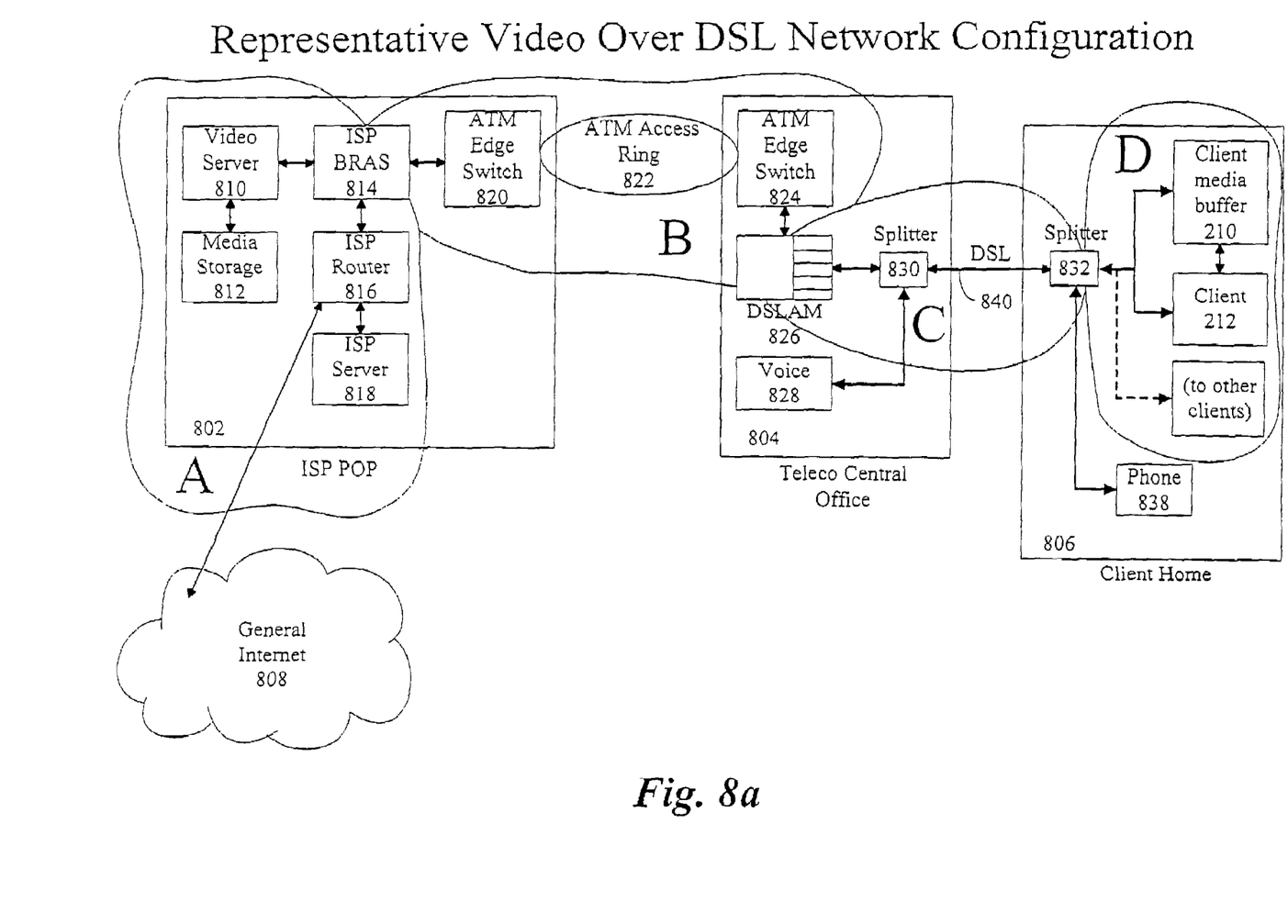
FIG. 8a is a block diagram of a telecommunications access network to which the invention may be applied, featuring a video server and a DSL link to the client.

FIG. 8a illustrates a typical telecommunications access network from a regional service provider to a client featuring a DSL link between a central office and the client home. Section 802 is at the level of the Internet service provider (ISP) point of presence (POP), and this section includes a video server 810, media storage 812, an ISP broadband remote access server (BRAS) 814, an ISP router 816, an ISP server 818, and an ATM edge switch 820. The video server 810 transmits video streams through the ATM network to each client, along with other data streams from the general Internet 808.

The ATM edge switch 820 connects the ISP server to an ATM access ring 822, which connects a plurality of telephone company (telco) central offices 804. Each central office connects to the ATM access ring 822 with an ATM edge switch 824, which transmits data to a digital subscriber line access multiplexer (DSLAM) 826. The DSLAM 826 converts the data to DSL format and directs traffic out to individual clients over their DSL links (840). Before traversing the DSL link 840, data from the DSLAM is merged with voice data (828) by a splitter 830.

The last-mile link into the client's home 806 is the DSL link 840. The DSL link terminates in a splitter 832, which separates voice from other data traffic (including the streaming video). Voice data is directed to a telephone 838 while data and video traffic is directed to the one or more clients 212 and client media buffers 210. The client receptacle might for instance take the form of a desktop personal computer or a set top box attached to a television. The video stream is directed to the client media buffer 210, which operates according to the teachings of this disclosure.

In one embodiment, the video stream is transmitted with a protocol stack described below for each region of the access network. Four regions are depicted as shaded areas and labeled A, B, C, and D in FIG. 8a. Region A includes the video server 810, the media storage 812, the ISP server 818, the ISP router 816, and a portion of the ISP BRAS 814. Region B includes a portion of the ISP BRAS 814, the ATM edge switch 820, the ATM access ring 822, the ATM edge switch 824, and a portion of the DSLAM 826. Region C includes a portion of the DSLAM 826, the splitter 830, the DSL link 840, and the splitter 832 (up to a DSL modem). Region D includes the DSL modem portion of the splitter 832, the client media buffer 210, and the one or more clients 212.

Figure 8B:
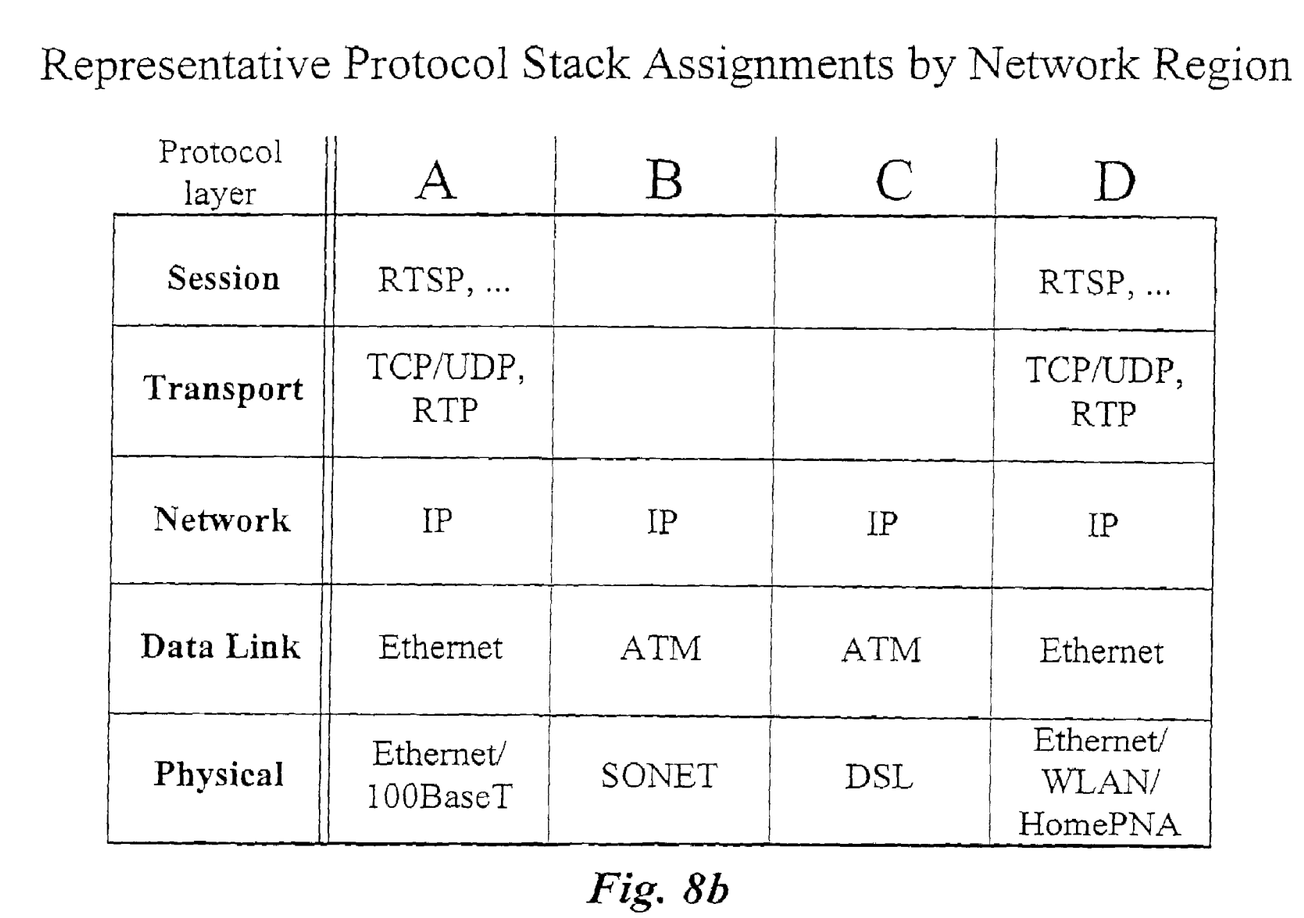

FIG. 8b is a chart describing the protocols specified for each of these four zones. The chart is based on the International Standard Organization's Open System Interconnect (ISO/OSI) model, which consists of seven layers: physical, data link, network, transport, session, presentation, and application. Only layers one through five are specified; higher layer protocols are to be determined by the application.

In region A, the physical layer operates on the Ethernet (e.g. 100BaseT) protocol. The data link layer also relies on Ethernet, while the network layer is handled by IP. The transport layer uses TCP for data traffic and UDP with RTP for real-time content (e.g. for the streaming video data). The RTSP protocol (Real Time Streaming Protocol) may be used at the session level.

In region B, SONET is used for the physical layer. ATM is the data link protocol, while IP is again used for the network layer.

In region C, the physical layer is handled by the DSL protocol. Again, ATM is used at the data link layer, and IP handles the network layer.

In region D, a variety of client home physical layer protocols, such as Ethernet, WLAN (wireless local area network), or HomePNA, may be used. The data link layer is typically handled by Ethernet, while IP is used again at the network layer. The transport layer uses TCP for data traffic and UDP with RTP for real-time content, such as the streaming video content. Finally, the RTSP protocol may be used at the session level.

Congestion can occur at a variety of places in the network described in FIGS. 8a and 8b. The predominant source of congestion is typically the ATM access ring 822. However, the DSL link 840, the ISP POP 802, the home network between splitter 832 and multiple clients 212, and the clients 212 themselves can also cause congestion. The present invention is capable of detecting each of these congestion situations at the client side and initiating error correction and flow control measures to ensure the steady delivery of a video stream to the client 212.

Telecommunications access networks of the sort described in FIG. 8a are increasingly common as DSL technology is adopted by a growing number of consumers. The present invention is directly applicable to these networks, and the preferred embodiment is designed to solve the problem of providing reliable high-quality streaming video over such networks. In particular, the present invention solves the problem of providing uninterrupted streaming video in the presence of a constrained last-mile link, such as a DSL link. By dropping the encoded bit rate for multiple users in the presence of heavy video traffic, the present invention can also improve the congestion situation of such networks as a whole.

4 Conclusions, Ramifications and Scope

The present invention provides a novel solution to several problems caused by network congestion. In particular, a client-side congestion detection and error avoidance method makes it possible for an individual client to continue streaming media at an acceptable quality level during periods of network congestion, even when the last-mile link to the client has constrained headroom. Furthermore, when streaming media traffic consumes a significant share of network bandwidth, the present invention provides a method for distributed congestion control in which clients at the edge of the network individually detect congestion and request server adjustments. These adjustments in the aggregate result in the alleviation of the congestion problem. The disclosed method for distributed congestion control is simpler than more centrally engineered solutions and thus more cost effective.

The disclosed invention is particularly useful for overcoming congestion problems for streaming audio and video over telecommunications access networks and last-mile DSL links to clients. However, it is envisioned that it can also provide quality improvements for a variety of streaming data types in a variety of other packet network settings, including but not limited to other IP over ATM networks, wireless data networks, and general IP networks.

Reference throughout this specification to "one embodiment" or "an embodiment" or the like means that a particular feature, structure, or characteristic described in connection with the embodiment is included in at least one embodiment of the present invention. Thus, the appearances of the phrases "in one embodiment" or "in an embodiment" or the like in various places throughout this specification are not necessarily all referring to the same embodiment. Furthermore, the particular features, structures, or characteristics may be combined in any suitable manner in one or more embodiments.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. An apparatus for detecting network congestion in a best-effort packet network, said packet network comprising at least one server and at least one client coupled to the at least one server via a link, said apparatus comprising:
   a client media buffer at the at least one client;
   a plurality of watermarks dividing said buffer into a plurality of regions depending on a presentation time for data remaining in the buffer; and
   a signaling device operatively coupled to the buffer by which said buffer sends signals to the at least one server to enact an error avoidance mechanism when said buffer operates in at least one of the regions,
   wherein the client media buffer operates in two modes, and wherein a first mode of the two modes comprises:
      an active zone including a resume water mark;
      an overflow alert zone above the active zone and separated from the active zone by a high water mark;
      a prioritized recovery zone below the active zone and separated from the active zone by a low water mark; and a stream switch zone below the prioritized recovery zone and separated from the prioritized recovery zone by an ultra low water mark.

2. The apparatus of claim 1, wherein a second mode of the two modes comprises:
a fill zone;
a switch test zone above the fill zone and separated from the fill zone by a resume mark; and
an overflow alert zone above the switch test zone and separated from the switch test zone by a high water mark.

3. The apparatus of claim 2, wherein said signals sent by the signaling device to the server depend upon the zone in which the client media buffer is operating.

4. The apparatus of claim 3, wherein when the overflow alert zone is reached in either said mode, then a pause signal is sent from the signaling device to the server to indicate that serving to that client media buffer is to be paused.

5. The apparatus of claim 4, wherein when the resume mark is crossed after having entered the overflow alert zone, then a resume signal is sent from the signaling device to the server to indicate that serving to that client media buffer is to be resumed.

6. The apparatus of claim 3, wherein when the prioritized recover zone is reached, then an increase priority signal is sent from the signaling device to the server to indicate that serving priority to that client media buffer is to be increased.

7. The apparatus of claim 6, wherein when the resume mark is crossed after having entered the prioritized recovery zone, then a resume signal is sent from the signaling device to the server to indicate that serving priority to that client media buffer is to be decreased.

8. The apparatus of claim 3, wherein when the stream switch zone is reached, then the signaling device sends a switch signal to the server to indicate to the server to begin transmitting to the client media buffer a stream encoded at a lower bit rate.

9. The apparatus of claim 8, wherein when the signaling device sends the switch signal to the server, the client media buffer enters the second mode in the fill zone.

10. The apparatus of claim 3, wherein when the switch test zone is reached, then the signaling device sends a switch test signal to the server to indicate to the server that it should begin to test conditions for switching from a lower-bit-rate stream to a higher-bit-rate stream.

* * * * *